United States Patent Office 2,736,356
Patented Feb. 28, 1956

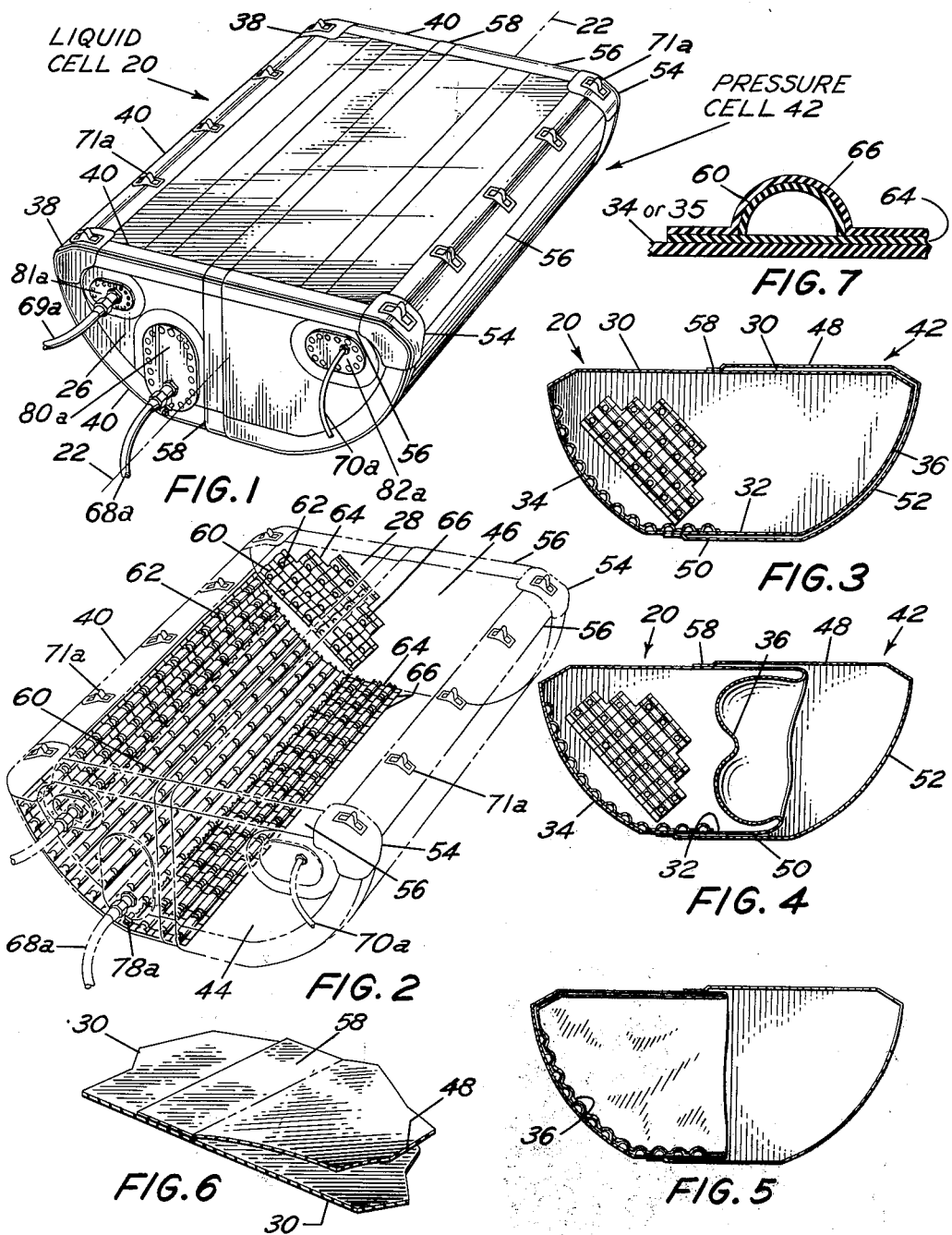

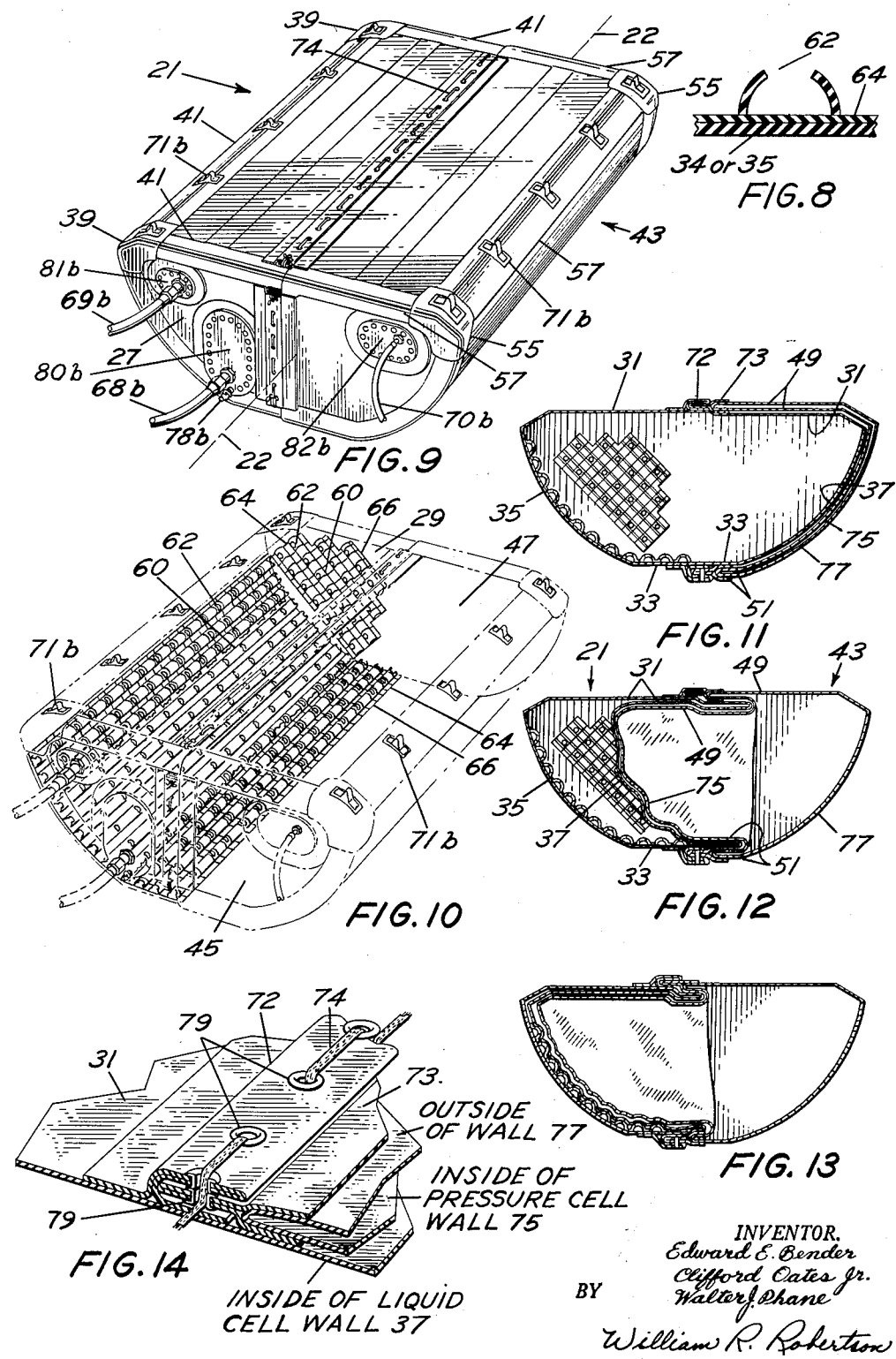

2,736,356

EXPELLANT BLADDER TYPE FUEL CELL

Edward E. Bender, Cuyahoga Falls, Ohio, Clifford Oates, Jr., North Hollywood, Calif., and Walter J. Phane, Cuyahoga Falls, Ohio, assignors of one-half to Chance Vought Aircraft, Incorporated, Dallas, Tex., a corporation of Delaware, and one-half to The Goodyear Tire & Rubber Company, Akron, Ohio, a company of Ohio Application October 18, 1954, Serial No. 462,844

10 Claims. (Cl. 150—.5)

This invention relates to pressure supply tanks for containing hydrocarbons such as fuel and lubricating oils, or other liquids. In its more restricted aspect it relates to vehicle collapsible fuel tanks having a pressure cell for forcefully expelling the fuel from the tank.

Pressure fuel tanks of the flexible, collapsible bladder type are used to advantage in vehicles that move violently about all axes, as in military tanks or as in aircraft. Because of the changing attitude of the fuel tank with its resulting shift of fuel, it is necessary to exert pressure in the tank to expel the fuel therefrom. Because the pressure fuel tank in a military tank or in an airplane is subject to violent movement and agitation in different directions and/or because the high pressures involved would cause the air to dissolve in the liquid and/or because the liquid may be inflammable, it is necessary to use a flexible wall for separating the pressure air from the liquid in the tank.

For use in vehicles of the type described above, oil or fuel tanks have presented a serious problem to the trade, and various and sundry types of tanks have been proposed. Metallic tanks are used to great extent, but present many undesirable features. The seams connecting the adjacent parts of the tank ultimately become impaired to the extent that they permit leakage of fuel. These seams or joints are often impaired due to the stresses and strains under which the vehicle is subjected, or due to objectionable vibrations which causes seepage of fuel by way of the rivets or other like means employed in the construction of the tank. Further, metallic tanks are subject to corrosion, as due to electrolytic or galvanic action set up by the introduction of foreign matter in the liquids to be contained.

The present invention provides a flexible, collapsible, fuel cell having a pressure cell enveloping substantially one half of the fuel cell and secured thereto whereby air or any inert gas introduced into the pressure cell will force the covered half of the fuel cell to act as a diaphragm and be deflected inwardly against the fuel, ejecting the fuel through an appropriate outlet. As the fuel is being expelled from the tank the deflecting flexible fuel cell sidewall will continue inwardly until it is tightly pressed against the inner surface of the stationary fuel cell sidewall. An important feature of this invention is that this latter sidewall of the fuel cell is provided with perforated half-round tubes to prevent the pocketing of the fuel, and which tubes accordingly provide complete fuel availability.

An object of this invention is to provide a flexible fuel tank with means for pressurizing the same.

Another object of the invention is to provide a vehicle fuel cell of the collapsible type having a pressure cell encompassing at least one half of the surface of the fuel cell and acting thereon.

Yet another object of the invention is to prevent wrinkling of the material of the fuel tank, particularly during low temperature operation since wrinkles are very detrimental to the serviceable functions of a fuel cell.

A further object is to provide a fuel cell of the above type having availability tubes to prevent pocketing of fuel, and to provide complete availability and expulsion of the fuel from the fuel cell when it is collapsed.

A further object is to provide in a fuel tank an improved means for connecting a pressure cell to a fuel cell.

Other objects and advantages will be apparent from the specification and claims, and from the accompanying drawings which diagrammatically illustrate by way of example, not by way of limitation, two forms of the invention.

In the drawings,

Figure 1 is a perspective view of the fuel tank of this invention;

Figure 2 is a phantom view of the tank of Fig. 1;

Figure 3 is a sectional view of the tank of Fig. 1 shown when filled with fuel;

Figure 4 is a sectional view similar to Fig. 3 showing the right hand wall of the fuel cell being deflected inwardly by pressure in the pressure cell, the fuel being partially expelled;

Figure 5 is a sectional view similar to Fig. 4 showing one of the outer walls of the fuel cell deflected inwardly to its fullest extent wherein all fuel has been discharged;

Figure 6 is a detail view showing the bonded joint between the pressure cell wall and the fuel cell wall;

Figure 7 is an enlarged fragmentary portion of the fuel cell wall of Fig. 3 illustrating the securing means of the availability tubes;

Figure 8 is a view similar to that of Fig. 7, but illustrating one of the openings in an availability tube;

Figure 9 is a perspective view of a modified form of fuel tank;

Figure 10 is a phantom view of the fuel tank of Fig. 9;

Figure 11 is a sectional view of the fuel tank of Fig. 9 shown filled with fuel;

Figure 12 is a sectional view similar to Fig. 11, but showing the inner wall of the pressure cell and the contiguous wall of the fuel cell deflected partway into the interior of the fuel cell;

Figure 13 is a sectional view similar to Fig. 12 but showing the pressure cell wall and the fuel cell wall completely deflected wherein all fuel has been discharged; and Figure 14 is a detail view showing the means of attachment between the pressure cell and the fuel cell in the fuel tank of Figs. 9–13.

Referring to the drawings, a fuel tank is shown comprising a liquid or fuel cell 20 and an air or inert gas pressure cell 42, and which tank is constructed about a vertical plane passing through the longitudinal center line 22 of the tank. The cells of the tank are constructed of flexible material impervious to the liquid or gas that they are intended to contain. They may be manufactured of any suitable material, but fabric coated or impregnated with neoprene or a synthetic rubber compound which is impervious and resistant to the deteriorating action of hydrocarbons, crude oils, or fuels is found preferable. It is found also that a tank so constructed is flexible, collapsible, and light in weight, the latter being of major importance when such tanks are used in aircraft.

The two flexible liquid and pressure cells may comprise the bladder for an additional rigid tank structure (not shown) or the two cells may comprise the fuel tank per se. In either case, the illustrated cells form a flexible liquid tank.

In Figs. 1–8, a fuel tank is disclosed comprising a basic fuel chamber or cell 20 with an external pressure air or inert gas half cell 42 overlying a portion of the fuel cell and secured thereto. The wall portion 36 of the basic cell which is overlapped or covered by the half cell serves as a diaphragm wall between the chambers of the two cells, thus separating the fuel from the air. A constant pressure is maintained in the pressure cell by any suitable source, not shown, as an engine driven compressor for example, or the fuel and pressure cells may be valved as required, whereby the pressure in the pressure cell may be reduced while the fuel cell is being filled. When the fuel tank is full, wall 36 is deflected to the extreme right, Fig. 3. Fuel is expelled from the fuel cell due to the constant pressure in the pressure cell, which pressure forces diaphragm wall 36 inwardly of the fuel cell, to the left in Fig. 4. With the egress of the fuel, diapragm wall 36 moves to the left until all fuel is ejected by complete collapse of diaphragm wall 36 against the opposite fuel cell wall 34, as seen in Fig. 5.

While the fuel cell may be constructed of any desired size and shape, the embodiment shown in Figs. 1–8 has two end walls 26 and 28, a top 30, a bottom 32 of smaller area than the top, and large arcuate side panels 34 and 36. Each of these parts are cut as separate panels and have their adjoining overlapped edges vulcanized together or adhesively bonded with a suitable cement or thermal setting adhesive.

To provide added strength, the corners and edges of the collapsible fuel cell 20 are reinforced by reinforcing members 38 and 40, respectively, which may be of the same product as the tank although preferably of greater thickness. For a reason which will be apparent later, the portion of the tank on the left side of centerline 22, as viewed in Fig. 1, is provided with reinforcing members of greater rigidity than the reinforcing members used on the corners and edges of the tank on the right hand side of centerline 22.

The pressure cell 42 is constructed of material similar to the material of fuel cell 20, and envelops at least half, and preferably more than half, of the fuel cell, as mentioned above. The pressure cell also has end walls 44, 46, a top 48, a bottom 50, arcuate side walls 36 and 52, reinforcing corners 54, and reinforcing edges 56, noting that side wall 36 is the wall common to both cells.

A further feature of our fuel tank concerns the location of the joint between the half-cell or pressure cell 42 and the whole or fuel cell 20. If the joint were in the middle of the fuel cell then when the fuel was completely expelled, fuel cell 20 would be collapsed with diaphragm wall 36 in juxtaposition or contiguous with the opposite fuel cell wall 34 whereby the aforementioned joint would be stretched or strained to its fully opened position. Failure through tear or rupture of the joint will result from continuous use, particularly in view of the above described strain and tension. To obviate this situation, we position this joint slightly to the left of the center of the fuel cell as seen in Figs. 3–5, i. e., so that a plane through the aforesaid joint lies to the left of the center line of the fuel cell. As seen in Fig. 5, even when the fuel cell is in fully collapsed position, the joint between the two cells can never be placed under a strain. The details of this joint are disclosed in Fig. 6 wherein flap 58, the edge of wall 48 of the pressure cell, is bonded to the surface of wall 30 of the fuel cell. Similarly, flap 58, an extension of each of the four sides, 44, 46, 48 and 50, of pressure cell 42, is bonded to the four surfaces 26, 28, 30 and 32 of fuel cell 20, forming an impervious connection between the pressure cell and the fuel cell.

Another feature of the new fuel tank concerns the construction of the reinforced corners and edges of the two cells. Fuel cell corners and edges 38, 40, respectively, are placed under greater strain than pressure cell corners and edges 54, 56, because the principal medium supported by the former is fuel while the principal medium supported by the latter is the inert gas. While reinforcing elements 54, 56 provide a limited amount of support of the fuel cell, as the fuel is expelled from the tank, reinforcing elements 54, 56 are relieved of the fuel load, leaving reinforcing elements 38, 40 to support the remaining fuel load. Accordingly, reinforcing corners and edges 54, 56 of the pressure cell may be constructed of a lighter material than reinforcing corners and edges 38, 40, of the fuel cell. Furthermore, since more flexibility is required in the right side wall of the fuel cell, or diaphragm 36, than in the left side wall 34 due to the necessity that the diaphragm wall 36 possesses the characteristic and ability to be contiguous or in juxtaposition with the left side wall 34, the right side wall 36 may be constructed of a lighter material. Moreover, since it is more critical that the imperviousness of the fuel cell be as much as or preferably greater than that of the pressure cell, the latter cell may be constructed of a lighter material than the fuel cell.

Attachment clip means 71a carried by the above described reinforcing elements are provided for securing the fuel and pressure cells in a rigid tank structure (not shown), as is usually preferable, wherein the aforesaid cells comprise the bladder thereof. In addition, where the disclosed fuel and pressure cells are used as the vehicle fuel tank per se, clip attachment means 71a are utilized to secure the tank to fuel tank supporting structure of the vehicle. In either case, the fuel and pressure cells form a pliable liquid tank.

As the fuel is expelled from the fuel tank, the diaphragm or side wall 36 of the fuel cell moves toward the opposite side wall 34 until it reaches the end of its travel. In flexible wall fuel cells, the liquid will form pockets and will be trapped therein if no outlets or drains are provided for each pocket. The result is a fuel tank which always carries therein a great amount of unusable fuel and accordingly is a fuel tank having a very low fuel availablity. Likewise, even in the absence of pockets, wrinkles may be formed. In low temperature operation these wrinkles are very detrimental to the serviceable functions of a fuel cell.

To prevent the forming of these disserviceable pockets in flexible fuel cells, availability means in the form of rubber tubes are secured inside one side wall 34, half of the bottom 32, and to each of the end walls 26, 28, as shown in Fig. 2. These availability tubes are formed from elongated rubber tubes which are slit down the middle from end to end, leaving two semicylindrical halves or half-tubes, 60. Fig. 7, an enlarged fragmentary portion of Fig. 3, illustrates an availability element or half-tube 60 formed of rubber or rubber-like material. Spaced openings 62, Figs. 2 and 8, are formed in the crest of each tube, forming perforated tubes. In securing the availability means in the tank, first, a patch 64 of impervious fabric material similar to that of the fuel cell is vulcanized or bonded, as by cementing, to the internal surfaces of the aforementioned fuel cell walls, 26, 28, 32, and 34. Second, the availability elements or half-tubes 60 are arranged in parallel rows on the patch in spaced relationship with each other by vulcanizing the edges of the half-tubes to the patch with the concave side of the half-tube facing the patch. The end wall half-tubes 60 are positioned at an angle to the plane of the top surface 30 as shown in Figs. 2–4. Third, a wide reinforcing strip 66, Figs. 2 and 7, which is also formed of an impervious fabric material overlies and is vulcanized or bonded to the half-tubes 60 between openings 62 and to patch 64. While strips 66 are utilized throughout the tank, they are deleted in parts in Figs. 2 and 10 for clarity of disclosure. Each of the half-tubes 60, patches 64, and strips 66 is composed of the same impervious and pliant rubber impregnated fabric material as the tank construction described above. As can readily be understood, pockets are prevented from forming in the rubber fuel tank, regardless of the attitude of the tank, due to the stiffening characteristics added by the availability elements to the supporting portion of the fuel cell. To fill the fuel cell, fuel is pumped in through inlet 69a forcing diaphragm wall 36 to the right, Figs. 5, 4, and 3, against the constant pressure maintained in the pressure cell. Fuel outlet 68a is provided with a drain valve 78a, Fig. 2. While the preferred embodiment illustrates the fuel outlet 68a in the end of the fuel tank, it may be positioned in the bottom of the cell if desired. A pressure air inlet-outlet 70a is provided in one end of the pressure cell, as illustrated in Figs. 1 and 2. The plate mountings 80a, 81a, and 82a are secured to the end walls of the cells with a suitable fastening means as an adhesive, rivets, or bolts. We have found the latter fastening means to be preferable. Access to the interior of the cells for cleaning or repair may be obtained through separate access doors (not shown) or by removal of the plate mountings.

In operation, fuel is expelled from basic cell 20 due to the pressure in pressure cell 42. Since the two cells are separated by a common cell wall or diaphragm 36, the constant pressure maintained in pressure cell 42 provides a constant pressure in fuel cell 20. Fuel is expelled from the fuel cell as the pressure cell expands and the fuel cell collapses, i. e., as diaphragm wall 36 approaches and eventually overlies opposite fuel cell wall 34. In prior rubber fuel tanks, when the above described collapsed position of the fuel cell is reached, pockets would form and trap vast quantities of fuel with no positive method of utilizing this fuel and thereby obtain complete availability of all fuel contained in the prior tanks. However, because of the addition of our availability means, pockets are prevented from forming in the large side wall 34, bottom 32, or in either of the end walls 26, 28, and fuel is prevented from being trapped therein. Complete fuel availability is accordingly assured at all times.

In the embodiment of Figs. 9–14, the fuel tank consists of two separate and complete fuel cells secured together, each constructed of a suitable fabric impregnated with neoprene or other synthetic rubber which is impervious and resistant to the deteriorating action of hydrocarbons, crude oils, or fuels. In the modified tank, one complete outer flexible cell 43 (for air pressure) is folded to encase over one-half of the whole fuel cell, 21. As shown in Figs. 9 and 14, the two cells 21 and 43 are detachably secured together so that when one cell becomes damaged, mere replacement thereof is easily achieved. The basic or fuel cell 21 of this modified tank structure has large arcuate sides 35 and 37, and reinforcing corners 39 and edges 41. Likewise, pressure cell 43 has arcuate sides 75 and 77, and reinforcing corners 55 and edges 57. The latter pressure cell corner and edge reinforcements may be constructed of lighter material for the same reasons explained above in the first embodiment. Further, while all six sides of the fuel cell, as well as those of the pressure cell of the second embodiment are jointed together in any suitable manner, we prefer adhesive bonding or vulcanizing. Each of fuel cell 21 and pressure cell 43 has an annular flap 72 and 73, respectively, Fig. 14, bonded around the periphery thereof. One edge of flap 72 is bonded to end walls, 27, 29, top 31, and bottom 33 of fuel cell 21, and an edge of flap 73 is bonded to end walls 45, 47, top 49 and bottom 51 of pressure cell 43. Each of the flaps has grommets spaced along the length thereof and a cord 74, or the like, laced through the grommets for detachably securing the cells together. With the fuel cell 21 in full condition, Fig. 11, pressure cell 43 lies folded over at least a half and preferably more than a half of the fuel cell. Therefore, the plane of the joint connection between the two cells 21, 43, is positioned to the left of the center line 22 of the tank, or so that when the tank is in fully collapsed condition, the above identified joint is not fully opened to its limiting position, as may be noted in Figs. 11–13. For refueling, the pressure and fuel cells may be valved as required, as explained in the first embodiment. In addition, due to the pressure sustained in pressure cell 43, side wall 75 thereof is always maintained contiguous with or in juxtaposition with side wall 37 of the fuel cell 21. Accordingly, the two walls 37, 75 form in effect a double diaphragm between the chambers of the cells, noting Fig. 12, particularly.

The inlets and outlets of the modified fuel cell, 21, and pressure cell, 43, are similar to those of the first embodiment of Figs. 1–8 and are similarly mounted in the tank. Fuel outlet conduit 68b and drain conduit 78b are secured to attaching plate mounting 80b which is bolted or otherwise secured as explained above in the first embodiment, to end wall 27 of the fuel cell. Likewise, fuel inlet conduit 69b and pressure inlet-outlet conduit 70b are secured to the end wall 27 of the fuel cell and end wall 45 of the pressure cell, respectively, by the respective attaching plate mountings 81b and 82b.

Attachment clip means 71B of this modification function similarly to the attachment means 71a of the first described embodiment. That is clips 71b support the fuel and pressure cells 21, 43, when they are used in a rigid tank structure (not shown) as a bladder therefor, or when the cells are used as the fuel tank per se and are attached to the vehicle fuel tank supporting structure.

Availability means are also provided in the fuel cell of the modified tank. Since in both embodiments all elements of the availability means, i. e., half-tubes 60 with openings 62, patches 64, and strips 66, are similar and function the same, like reference numerals are used throughout the case.

In operation of the embodiment of Figs. 9–14, fuel in the basic cell 21 is expelled through conduit 68b due to the constant pressure maintained in pressure cell 43, wherein air under pressure is supplied through conduit 70b (from the vehicle air compressor or other suitable source) to the pressure air cell 43. As the fuel is expelled (through outlet conduit 68b), flexible arcuate side wall 37 of the fuel cell 21, under the influence of the constant air pressure in pressure cell 43 and its wall 75, moves from right to left as seen in Figs. 11–13. Referring to Figs. 11–13, contiguous walls 37 and 75 act as a double diaphragm as they expel the fuel from the fuel cell. As the fuel is expelled the diaphragm moves to the left, Fig. 11, through the half-full position of Fig. 12 toward the empty or fuel cell-collapsed position of Fig. 13. In the latter position the diaphragm walls 37, 75 are forced to lie in juxtaposition or contiguous with the fuel cell walls 35, 27, and 29 and the availability means thereon. Because of the availability means with the fuel flowing over and through the availability tubes, no disserviceable pockets or wrinkles are permitted to form and trap any fuel therein. Accordingly, complete availability and expulsion of the fuel from the fuel cell is obtained.

While this invention has been illustrated and described as applied to fuel tanks, it is to be distinctly understood that the principles here disclosed are equally adaptable for use in pressure containers for liquids other than fuel. Other changes, modifications, substitutions, additions, and omissions may be made in the structure here illustrated without departing from the spirit and scope of the invention and appended claims.

We claim:

1. In an expellant bladder flexible liquid tank having a liquid cell and a pressure gas cell, said liquid cell having an outlet means and said gas cell having an inlet means, wherein one side of the liquid cell is collapsed against the other side of the liquid cell by expansion of the pressure gas cell to expel the liquid from within the liquid cell, availability means comprising a plurality of perforated tubes secured to and covering a major portion of the internal surface of said liquid cell for preventing pocketing of the liquid and for providing complete availability and expulsion of the liquid from said liquid cell when it is collapsed by the pressure gas cell.

2. A flexible liquid containing tank formed of impervious and pliant material comprising diaphragm wall means between two side walls of the tank for forming the tank into a liquid cell and a pressure gas cell, said liquid cell having an outlet means and said gas cell having an inlet means, whereby when either of said cells is totally collapsed the diaphragm wall means is contiguous with the side wall of the collapsed cell, and availability means secured to and covering a major portion of the internal surface of said liquid cell for preventing pocketing of the liquid and for providing complete availability and expulsion of the liquid from said liquid cell when it is collapsed.

3. The structure as recited in claim 2 wherein the availability means comprises a plurality of tubes, each tube having spaced openings therein to provide availability and expulsion of all liquid from said liquid cell when it is fully collapsed.

4. The construction recited in claim 2 wherein the availability means comprises an impervious and pliant patch secured to an internal wall of the liquid cell, an impervious and pliant tube with openings therein secured to the patch, and an impervious and pliant strip overlying and secured to said patch and to said tube intermediate the openings therein for preventing pocketing of the liquid and for providing complete availability and expulsion of the liquid from said liquid cell when it is fully collapsed.

5. A fuel tank as recited in claim 2 wherein the gas cell comprises an external half cell connected to the liquid cell, the encased portion of the liquid cell comprising a portion of the gas cell and also comprises the diaphragm.

6. A flexible liquid tank as recited in claim 2 wherein the gas cell comprises a complete outer flexible cell connected to the liquid cell, the portion of the gas cell encasing a portion of the liquid cell and the encased fuel cell portion comprising a double diaphragm.

7. A tank comprising a basic liquid cell having an outlet means and a gas cell folded to encase a substantial portion of the basic cell, said gas cell having an inlet means, and connecting means for the two cells securing them together so that the portion of the basic cell thus covered forms a diaphragm whereby liquid in the basic cell on the liquid side of the diaphragm is expelled and the basic cell is collapsed by applying gas to the other side of the diaphragm within the gas cell, said connecting means comprising an annular flap, said flap comprising the peripheral edge of the gas cell portion encasing the basic cell, and said flap secured to the fuel cell to form the two cell basic tank.

8. A tank comprising a basic liquid cell having an outlet means and a gas cell folded to encase a substantial portion of the basic cell, said gas cell having an inlet means, and connecting means for the two cells securing them together so that the portion of the basic cell thus covered forms a diaphragm whereby liquid in the basic cell on the liquid side of the diaphragm is expelled and the basic cell is collapsed by applying gas to the other side of the diaphragm within the gas cell, the peripheral edge of the gas cell portion encasing the basic cell forming a first annular flap, a second annular flap secured to said basic cell and positioned adjacent said first annular flap, said flaps being detachably interconnected to form the connecting means whereby a two cell basic tank is formed.

9. A tank comprising a basic liquid cell having an outlet means and a gas cell folded to encase a substantial portion of the basic cell, said gas cell having an inlet means, and connecting means for the two cells securing them together so that the portion of the basic cell thus covered serves as a diaphragm whereby liquid in the basic cell on the liquid side of the diaphragm is expelled and the basic cell is collapsed by applying gas to the other side of the diaphragm within the gas cell, the peripheral edge of the gas cell portion encasing the basic cell forming a first annular flap means, a second annular flap means secured to said basic cell and positioned adjacent said first annular flap means, each of said flap means having spaced openings therein, and a cord means for passing through said openings for lacing the first and second flap means together to form said connecting means whereby a two cell basic tank is formed.

10. A tank comprising a basic liquid cell having an outlet means and an adjacent gas cell having an inlet means, said gas cell being folded to encase a substantial portion of said basic cell, and connecting means for providing that the portions of the basic liquid cell and of the adjacent gas cell thus covered form a double diaphragm whereby liquid in the basic cell is expelled through said outlet means when the basic cell is collapsed by expansion of said gas cell when gas is injected therein through said inlet means.

References Cited in the file of this patent

UNITED STATES PATENTS

| | | |
|---|---|---|
| 2,097,985 | Maryott | Nov. 2, 1937 |
| 2,120,013 | Bates | June 7, 1938 |
| 2,387,598 | Mercier | Oct. 23, 1945 |